United States Patent [19]

Kanke

[11] Patent Number: 5,139,302
[45] Date of Patent: Aug. 18, 1992

[54] WINDOW MOLDING FOR AUTOMOTIVE VEHICLE

[75] Inventor: Yoshio Kanke, Kanagawa, Japan
[73] Assignee: Nissan Motor Co., Ltd., Yokohama, Japan
[21] Appl. No.: 732,288
[22] Filed: Jul. 18, 1991
[30] Foreign Application Priority Data Jul. 19, 1990 [JP] Japan .................. 2-189316

[51] Int. Cl.⁵ .............................. B60J 10/02
[52] U.S. Cl. .................... 296/93; 296/201; 52/400
[58] Field of Search ........... 296/93, 201; 52/400, 52/208

[56] References Cited
U.S. PATENT DOCUMENTS 4,757,660  7/1988  Miyakawa et al. ............ 296/93
4,984,839  1/1991  Miyakawa et al. ............ 296/93
5,035,459  7/1991  Yada ........................... 296/93
5,044,684  9/1991  Yada ........................... 296/93

FOREIGN PATENT DOCUMENTS 59-50815  4/1984  Japan .

Primary Examiner—Robert R. Song
Attorney, Agent, or Firm—Pennie & Edmonds

[57] ABSTRACT

A window molding comprises of a molding element and a pair of leg elements for defining grooves of varying height for preventing water such as rain on a windshield from flowing over the molding to the side of a vehicle body. The molding element is uniform in cross section and a single piece. The leg elements gradually increasing in height toward predetermined longitudinal ends and are indepenedent from the molding element and mechanically fastened to same.

12 Claims, 9 Drawing Sheets

WINDOW MOLDING FOR AUTOMOTIVE VEHICLE

BACKGROUND OF THE INVENTION

1. Field of the Invention

The present invention relates to a window molding for an automotive vehicle, particularly of the kind adapted to define a groove for preventing water such as rain on a windshield from flowing over the molding to the side of a vehicle body.

2. Description of the Prior Art

An example of a prior art window molding of the above described kind is disclosed in Japanese Provisional Utility Model Publication No. 59-50815 and also shown in FIGS. 14 and 15.

In the figures, 1 is a window molding disposed along the peripheral edges of a windshield 2. The window molding 1 consists of an upper molding portion 3 disposed along an upper peripheral edge of the windshield 2 and two side molding portions 4 disposed along opposite side peripheral edges of the windshield 2. The upper and side molding portions 3 and 4 are joined together by welding. The upper molding portion 3 is elongated in the vehicle width direction and has a uniform cross section. The side molding portions 4 are elongated in the longitudinal direction of the vehicle and each have an integral leg 5 which gradually increases in height toward a lower longitudinal end. The leg 5 is adapted to form a groove for preventing water such as rain on the windshield 2 from flowing over the molding 1 to the side of the vehicle body. The lower peripheral edge of the windshield 2 is attached to the vehicle body by way of a weatherstrip though not shown in the drawing.

A problem of the prior art window molding is that since the upper molding portion 3 and side molding portions 4 need to be prepared separately due to the provision of the legs 5 and be joined together by welding there are inevitably provided between the molding portions 3 and 4 seamed or welded portions which require a difficult and time-consuming finish. Since the molding 1 is easily seen or observed from the outside of the vehicle, it inevitably deteriorates the appearance of the vehicle unless the seamed portions 6 are finished fine or beautifully. Further, in the case where the window molding 1 is to be finished in black-coloring in its entirety, only coating with paint can be used, which is disadvantageous from the cost point of view.

SUMMARY OF THE INVENTION

In accordance with the present invention, there is provided a novel and improved window molding for an automotive vehicle which comprises a single-piece molding element of a uniform cross section, having an inverted U-like shape including an upper portion and opposite side portions, a pair of leg elements gradually increasing in height toward predetermined longitudinal ends for defining grooves extending along the side portions of the molding element, and mechanical fastening means for mechanically fastening the leg elements to the side portions of the molding element, respectively.

This structure is effective for solving the above noted problems inherent in the prior art device.

It is accordingly an object of the present invention to provide a novel and improved window molding for an automotive vehicle which can attain an excellent appearance.

It is another object of the present invention to provide a novel and improved window molding of the above described character of which molding element does not require any seamed or welded portion.

It is a further object of the present invention to provide a novel and improved window molding of the above described character which can form a groove for assuredly preventing water such as rain on a windshield from flowing over the molding to the side of the vehicle body.

DETAILED DESCRIPTION OF THE PREFERRED EMBODIMENTS

Figure 1:
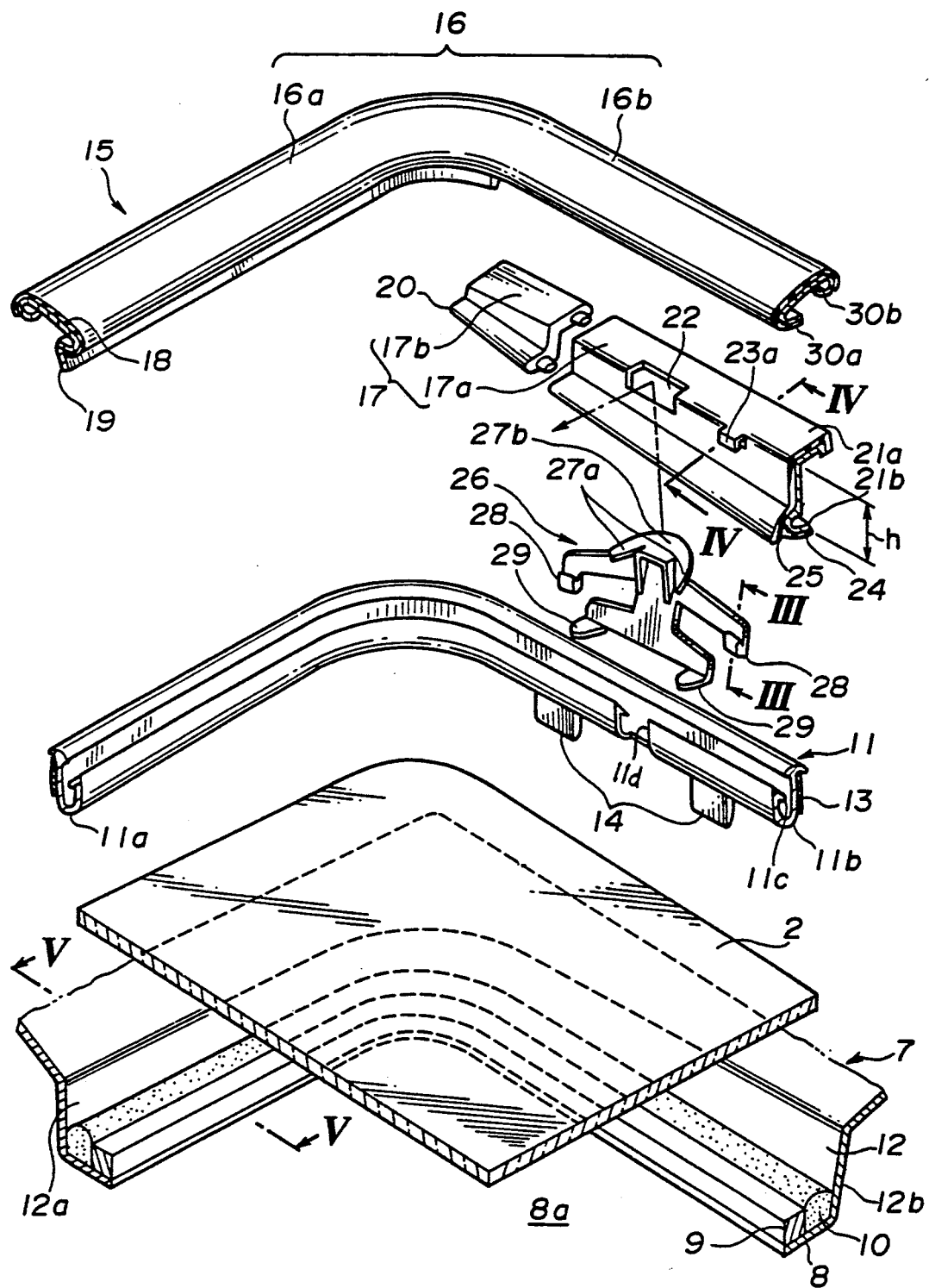
FIG. 1 is a fragmentary exploded view of a window molding for an automotive vehicle according to an embodiment of the present invention, together with an associated windshield, vehicle body panel, etc.
Figure 2:
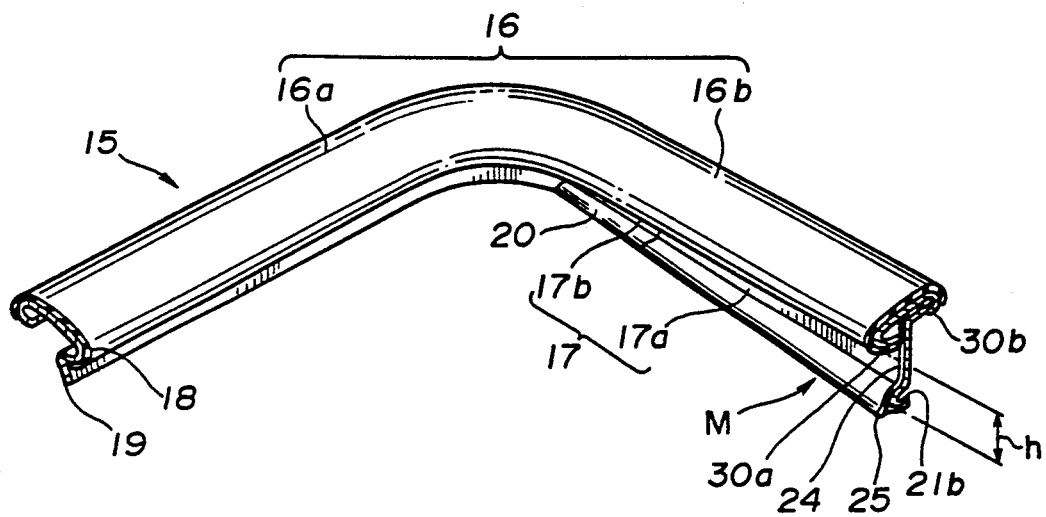
FIG. 2 is a fragmentary perspective view of an assembly of a molding element and a leg element utilized in the window molding of FIG. 1.
Figure 3:
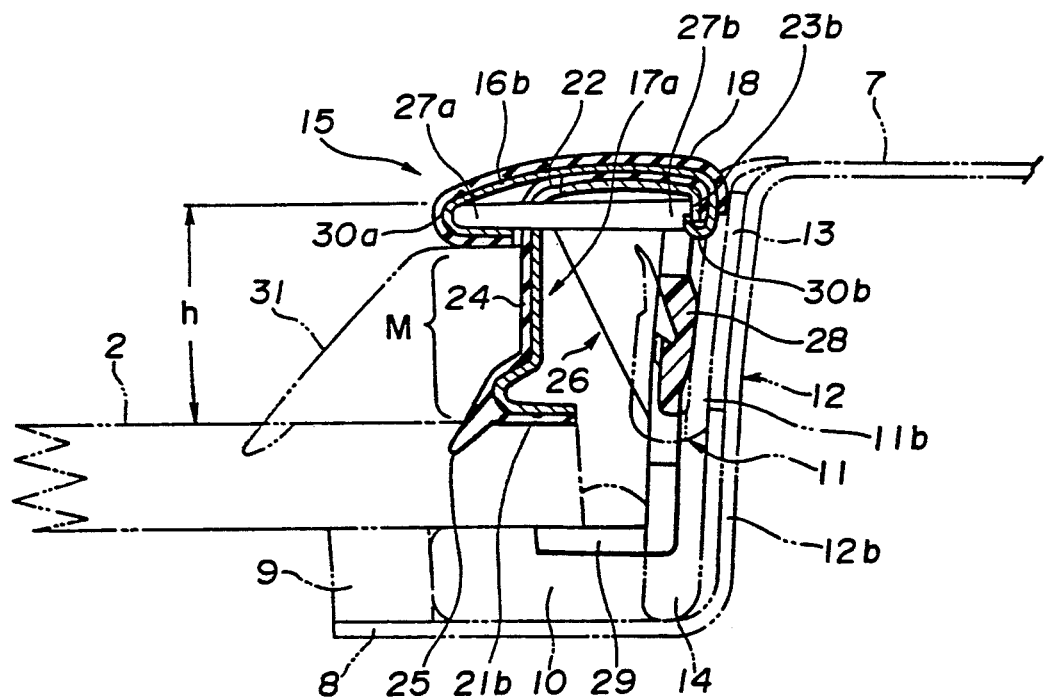
FIG. 3 is a sectional view taken along the line III—III of FIG. 1 and shows the window molding installed in place between the windshield and the vehicle body panel.

Referring to FIGS. 1 to 5 and 14, indicated by the reference numeral 7 is a vehicle body panel having a flanged opening portion 8 defining a window receiving opening 8a. The flanged opening portion 8 is recessed to have a receding wall 12 and a flange (no numeral) at an inner end of the receding wall 12. The flanged opening portion 8 is provided with a dam rubber 9 and sealant-adhesive 10 by means of which a peripheral portion of a windshield 2 is secured to the flanged opening portion 8. A fastener 11 of a J-like cross section is bonded to the receding wall 12 of the flanged opening portion 8 by means of a double-faced adhesive tape 13.

The receding wall 12 is uniform in height at its upper portion 12a but gradually increases in height at its side portions 12b as the side portions 12b extend increasingly toward the lower longitudinal ends.

The fastener 11 has at an inner end of each side portion 11b a plurality of tongue-like projections 14 at predetermined intervals and of the varying height corresponding to the varying height of the side portion 12b of the receding wall 12 so that by the effect of the tongue-like projections 14 in contact with the flanged opening portion 8 the fastener 11 is held in place above the flanged opening portion 8. Such tonge-like projections 14 are not provided to an upper portion 11a of the fastener 11.

A window molding according to an embodiment of the present invention is generally indicated by 15 and shown as comprising a molding element 16 and a leg element 17. The molding element 16 has a uniform C-like cross section and is a single piece made of a stainless steel so as to have an upper portion 16a continuous or consecutive with each side portion 16b. The molding element 16 is provided with an external covering 18 of PVC. The external covering 18 and molding element 16 are produced or formed by a common extrusion process, i.e., by extrusion of composite material. The molding element 16 with the external covering 18 is then bent into a predetermined inverted U-like shape.

The external covering 18 has at an inboard end an integral lip 19 which is provided to only the upper portion 16a.

The leg element 17 consists of a main leg portion 17a and an end portion 17b. The end portion 17b is joined to the main leg portion 17a to serve as an upper end portion of the leg element 17. The end portion 17b is formed with a lip 20 which extends successively or continuously with the lip 19 of the molding element 16. The main leg portion 17a is made of stainless steel and shaped so as to gradually increase in height toward a lower longitudinal end. The main leg portion 17a has inward flanged, inboard and outboard end portions 21a and 21b. The inboard end portions 21b has a resilient U-like bent portion. The outboard end portion 21a has an inverted U-like cross section and has at an inner corner portion a plurality of openings 22 and integral fingers 23a at predetermined intervals in the longitudinal direction of the leg element 17. The fingers 23a are formed by cutting and forming which are performed at a single pressing process. The outboard end portion 21a further has at an outer corner portion a finger 23b for engagement with the molding element 16. Similarly to the molding element 16, the main leg portion 17a is provided with an external covering 24 of PVC by a common extrusion process. The external covering 24 has at an inboard end an integral lip 25.

A plurality of clips 26, though only one is shown, are provided for attaching the window molding 15 constituted by the main molding element 16 and the leg element 17, to the vehicle body panel 7. Each clip 26 has at an outboard end a pair of upper grip fingers 27a and a locking portion 27b capable of passing through the opening 22 of the leg element 17 to protrude outward therefrom, a pair of hooks 28 engageable with a correspondingly hooked end portion 11c of the fastener 11, and a pair of lower grip fingers 29 for engagement with an inboard side surface of the windshield 2 for cooperating with the upper grip fingers 27a to urge the molding element 16 and the leg element 17 against the windshield 2.

Figure 4:
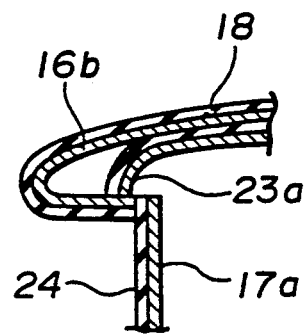
FIG. 4 is a fragmentary sectional view taken along the line IV—IV of FIG. 1 and shows a finger of the leg element engaged with the molding element.
Figure 5:
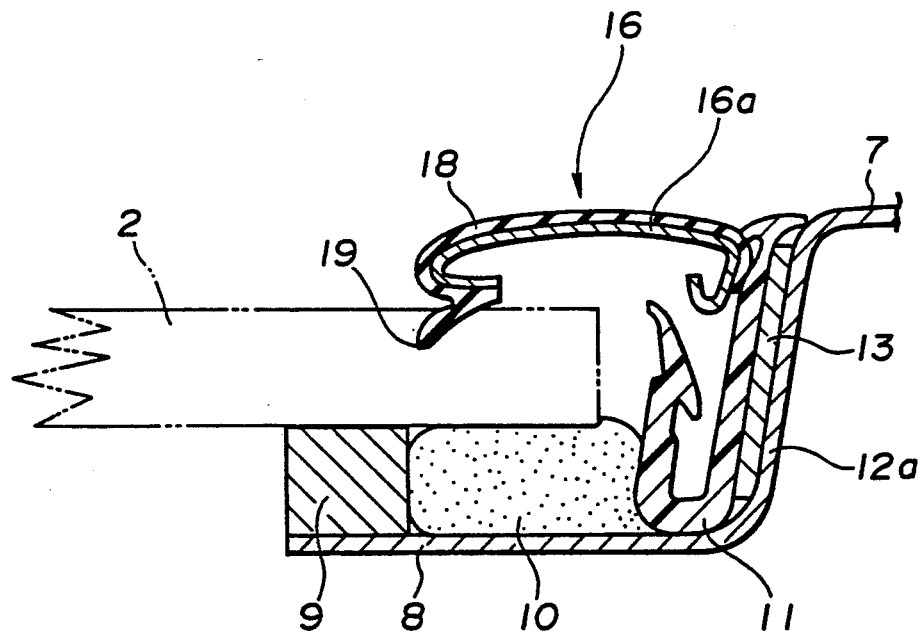
FIG. 5 is a sectional view taken along the line V—V of FIG. 1 and shows the window molding installed in place between the windshield and the vehicle body panel.
Figure 6:
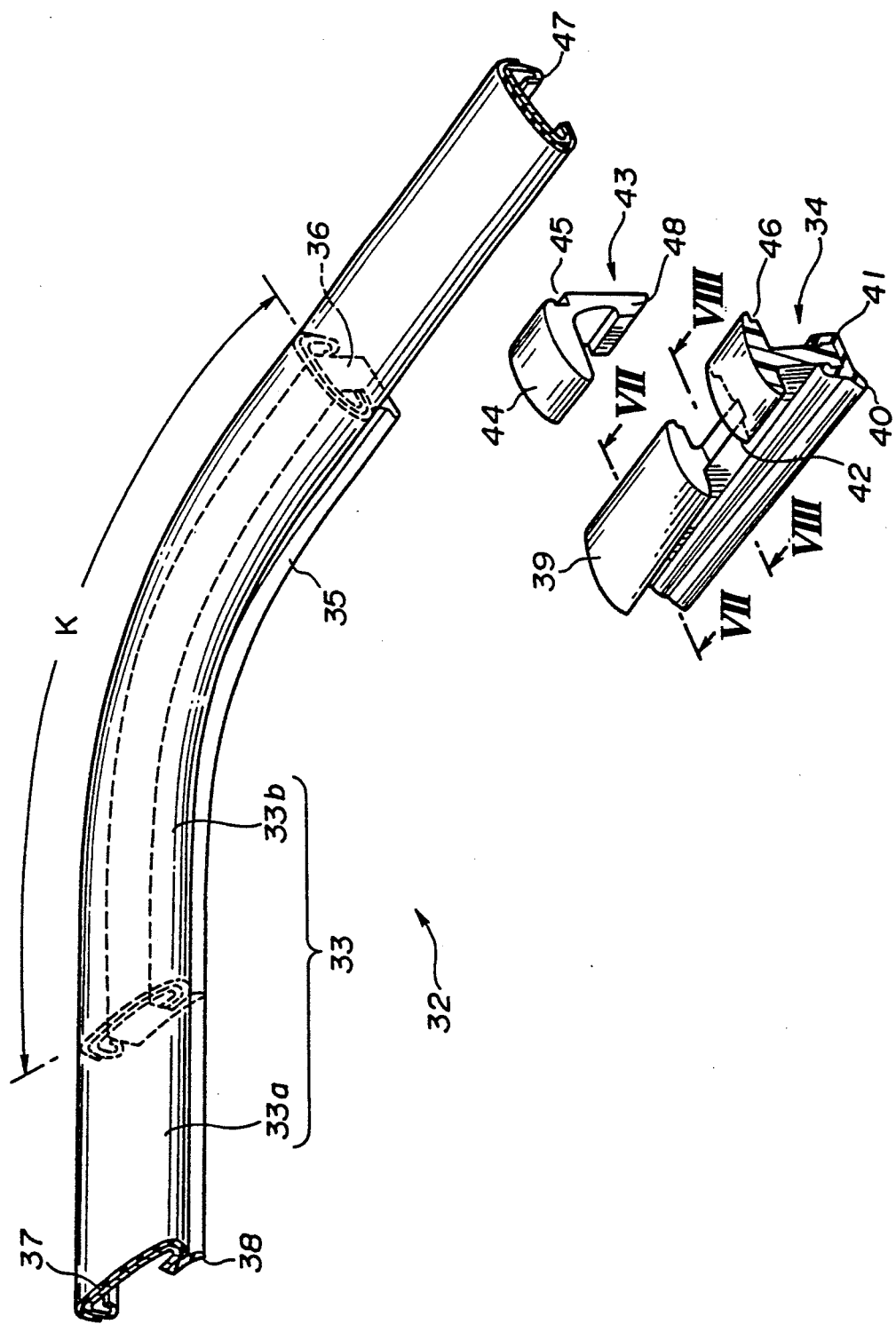
FIG. 6 is a fragmentary exploded view of a window molding according to another embodiment of the present invention.
Figure 7:
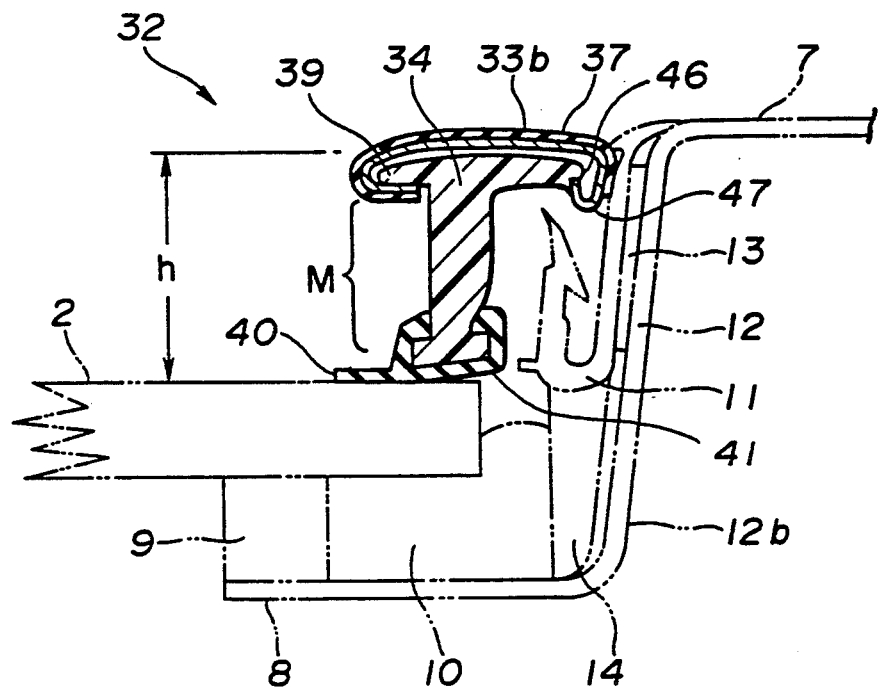
FIG. 7 is a sectional view taken along the line VII—VII of FIG. 6 and shows one way of installation of the window molding between the windshield and the vehicle body panel.
Figure 8:
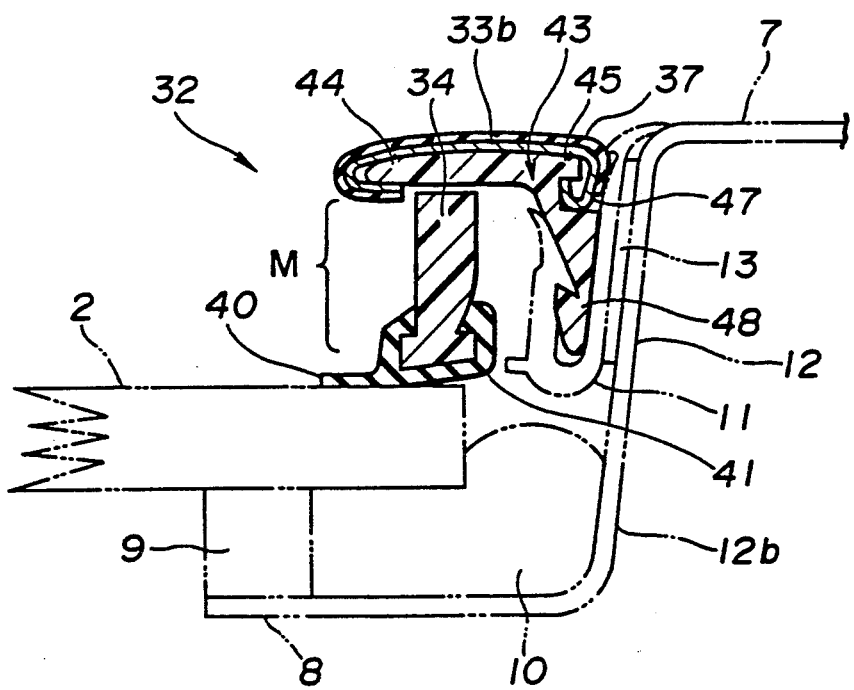
FIG. 8 is a sectional view taken along the line VIII—VIII of FIG. 6 and shows another way of installation of the window molding between the windshield and the vehicle body panel.

The molding element 16 and the leg elements 17 are assembled as follows. Firstly, the outboard end portion 21a of each leg element 17 is inserted into the side portion 16b of each molding element 16. By this, the fingers 23a of each leg element 17 are engaged with a curved outer end 30a of the side portion 16b of the molding element 16 as shown in FIG. 4. Then, a curved inner end 30b of the side portion 16b of the main molding element 16 is bent to engage the finger 23b of each leg element 17. By this, the main molding element 16 and the leg element 17 are assembled together.

The thus assembled window molding 15 can form a groove "M" of varying height between the main molding element 16 and the inboard end portion 21b of each leg element 17 for preventing water such as rain on the windshield 2 from flowing over the molding 15 to the side of the vehicle body.

The clips 26 are installed on the assembly of the molding element 16 and leg element 17 as follows. Firstly, the outboard end of each clip 26 is inserted into the corresponding opening 22 of each leg element 17 of the window molding 15 to allow the outer grip fingers 27a and locking portion 27b to be engaged with the curved inner and outer end portions 30a and 30b of the molding element 16, respectively.

After the windshield 2 is installed in place on the flanged opening portion 8 of the vehicle body panel 7 provided with the dam rubber 9 and sealant-adhesive 10, the assembly of the molding element 16, leg element 17 and clips 26 assembled is installed in the space between the windshield 2 and the vehicle body panel 7 by holding the periphery of the windshield 2 between the outboard fingers 29 of each clip 26 and the inboard end 21b of the leg element 17 and engaging the hooks 28 of each clip 26 with the correspondingly hooked inner end 11c of the fastener 11 bonded to the flanged opening portion 8 by the double-faced adhesive tape 13. By this, the window molding 15 is installed in place on the vehicle body panel 7 partly by the action of the sealant-adhesive 10. In this connection, the fastener 11 is formed with a plurality of cuts 11d, though only one is shown, for receiving therein the clips 26 so that the clips 26 can be installed in place without interefering with the fastener 11.

In the meantime, indicated by the reference numeral 31 is a snow taper element which is optionally installed in a snowy country for preventing storage of snow in the groove "M".

From the foregoing, it will be understood that since the molding element 16 has a uniform cross section it can be a single piece produced by extrusion and bending, thus allowing the upper portion 16a and the side portion 16b to be continuous or consecutive with each other, thus not requiring any seamed portion such as a welded portion and therefore making it possible for the window molding 15 to attain an excellent appearance. In this connection, it will be understood that since the molding element 16 is provided with the leg element 17 which gradually increases in height toward the lower longitudinal end, it can be assuredly attained the groove "M" of varying height for preventing water such as rain on the windshield 2 from flowing over the window molding 15 to the side of the vehicle body.

Referring to FIGS. 6 to 11, a window molding 32 according to another embodiment of the present invention, similarly to the previous embodiment of FIGS. 1 to 5, includes a single-piece molding element 33 of a uniform cross section and having an upper portion 33a and a side portion 33b extending continuously with each other, and leg element 34 gradually increasing in height "h" toward a lower longitudinal end. Each corner portion "K" of the molding element 33, which is an upper end part of the side portion 33b of the molding element 33, is provided with an end rubber 36 having a lip 35. An external covering 37 of the molding element 33 is formed with a lip 38 which extends consecutively or continuously with the lip 35. The leg element 34 is made of a synthetic resinous material and has at an outboard end a head portion 39 installed in the side portion 33b of the molding element 33 and at an inboard end an external covering 41 formed with a lip 40. The head portion 39 of the leg element 34 is formed with a cut-out 42 for receiving therewithin a head portion 44 of a clip 43.

The head 44 of the clip 43 is fitted in the cut-out 42 in the head portion 39 of the leg element 34, and the leg element 34 and the clip 43 are all together installed in the side portion 33b of the molding element 33 to be engaged therewith. The head portion 44 of the clip 43 and the head portion 39 of the leg element 34 are respectively recessed to have engaging portions 45 and 46 with which an outer end 47 of the molding element 33 is bent to engage. On the other hand, the head portion 39 of the leg element 34 and the head portion 44 of the clip 43 are abuttingly engaged with an inward bent portion of the molding element 33. By this, the molding element 33, leg element 34 and clip 43 are joined to constitute an assembled unit 32. The assembled unit 32 is installed in the space between the vehicle body panel 7 and the windshield 2 while allowing a hook 48 of the clip 43 to be engaged with the fastener 11. By this, partly by the action of the sealant-adhesive 10, the assembled unit 32 is held in place on the vehicle body.

Figure 9:
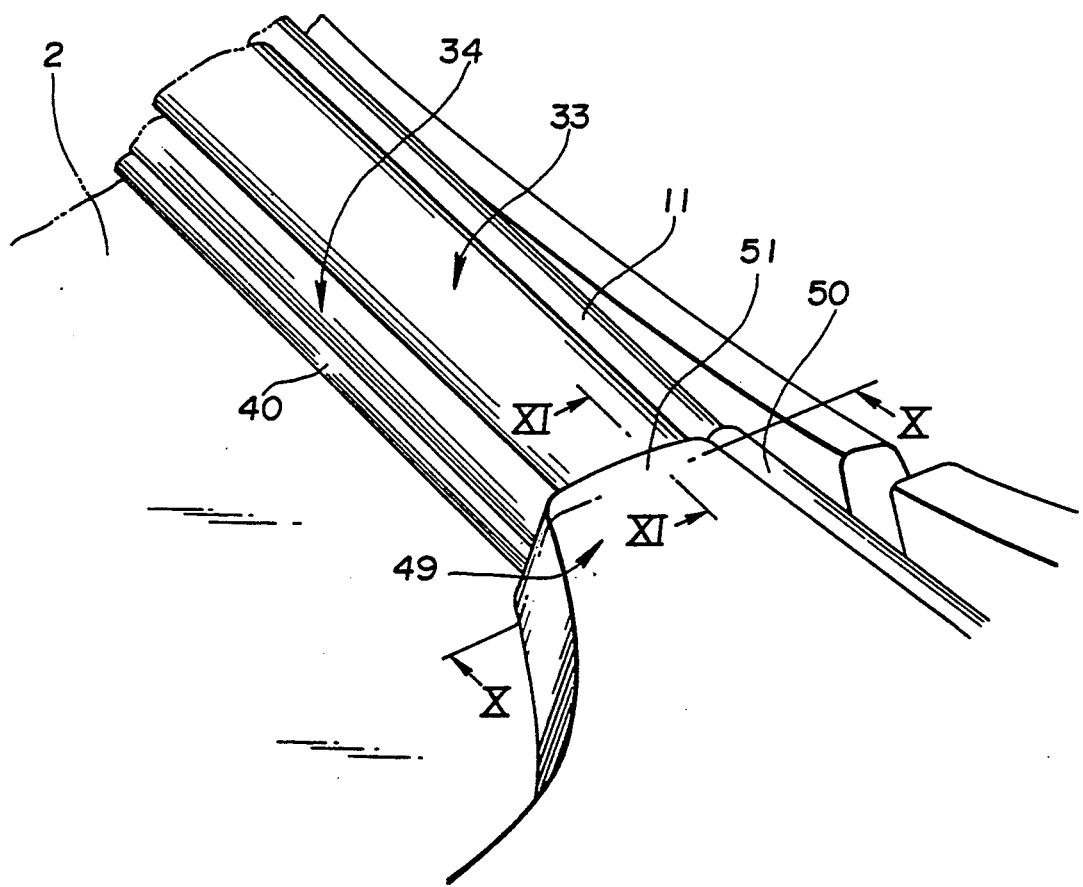
FIG. 9 is a perspective view of a joining portion between a cowl cover and a window molding.
Figure 10:
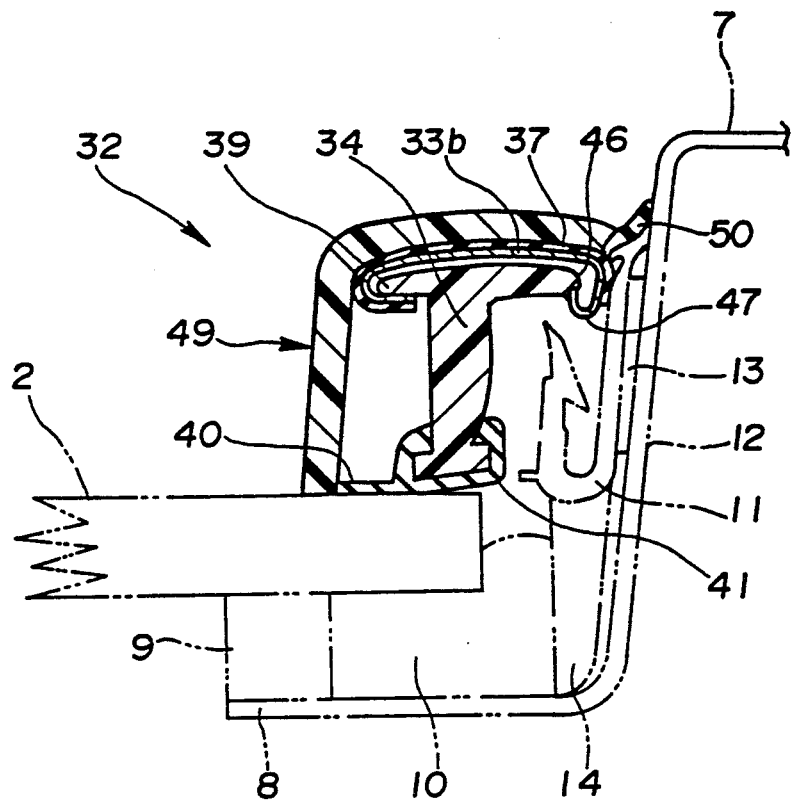
FIG. 10 is a sectional view taken along the line X—X of FIG. 9.
Figure 11:
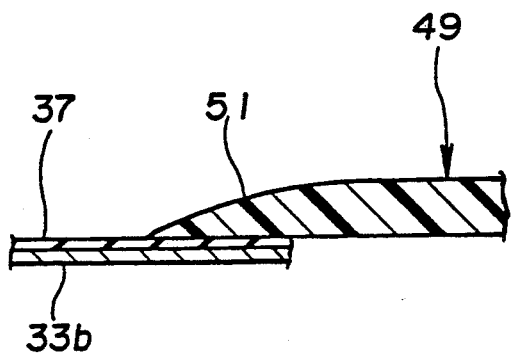
FIG. 11 is a sectional view taken along the line XI—XI of FIG. 9.

FIG. 9 shows a joining portion between a lower end of the window molding and a cowl cover 49. The cowl cover 49 has at an outer end a lip 50 abuttingly engaged with the receding wall 12 of the flanged opening portion 8 of the vehicle body panel 7. The cowl cover 49 has at an upper end an inclined outer surface portion smoothly continuous or consecutive with the outer surface of the molding element 33. Except for the above, this embodiment is substantially similar to the previous embodiment of FIGS. 1 to 5.

Figure 12:
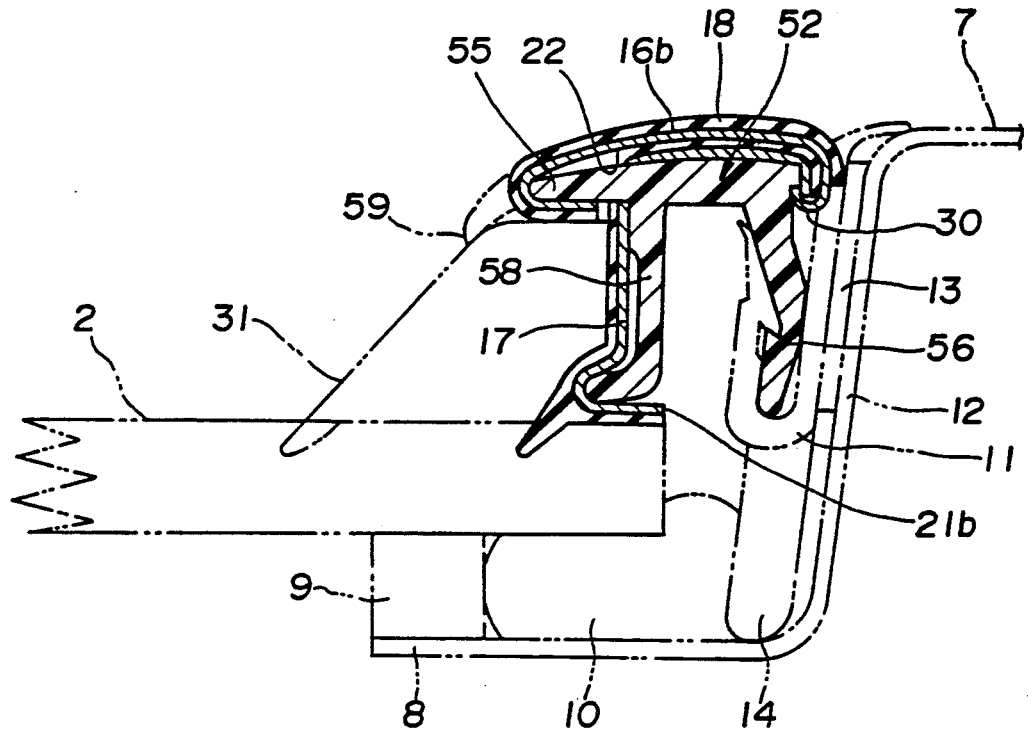
FIG. 12 is a view similar to FIG. 3 but shows a window molding according to a further embodiment of the present invention.

FIG. 12 shows a further embodiment which is substantially similar to the previous embodiment of FIGS. 1 to 5 except for a clip 52. The clip 52 is a single piece and has a head portion 55 protruding outward from the opening 22 of the leg element 17, a hook 56 engaging the fastener 11, and a reinforcing portion 58 fitted in the flanged inboard end 21b of the leg element 17. Since the leg element 17 is reinforced by the reinforcing portion 58 of the clip 52, the leg element 17 can be pressed against the windshield 2 with an increased force. In the meantime, when the snow taper element 31 is installed optionally, a lip 59 extending along the snow taper element 31 may be provided to the molding element 16.

Figure 13:
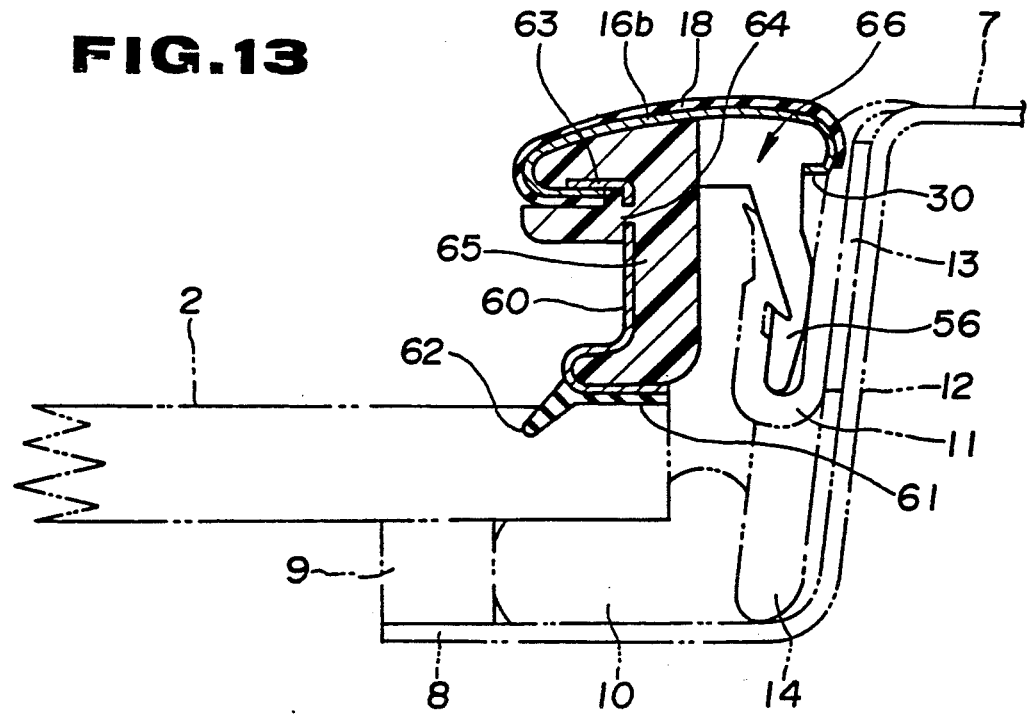
FIG. 13 is a view similar to FIG. 3 but shows a window molding according to a further embodiment of the present invention.
Figure 14:
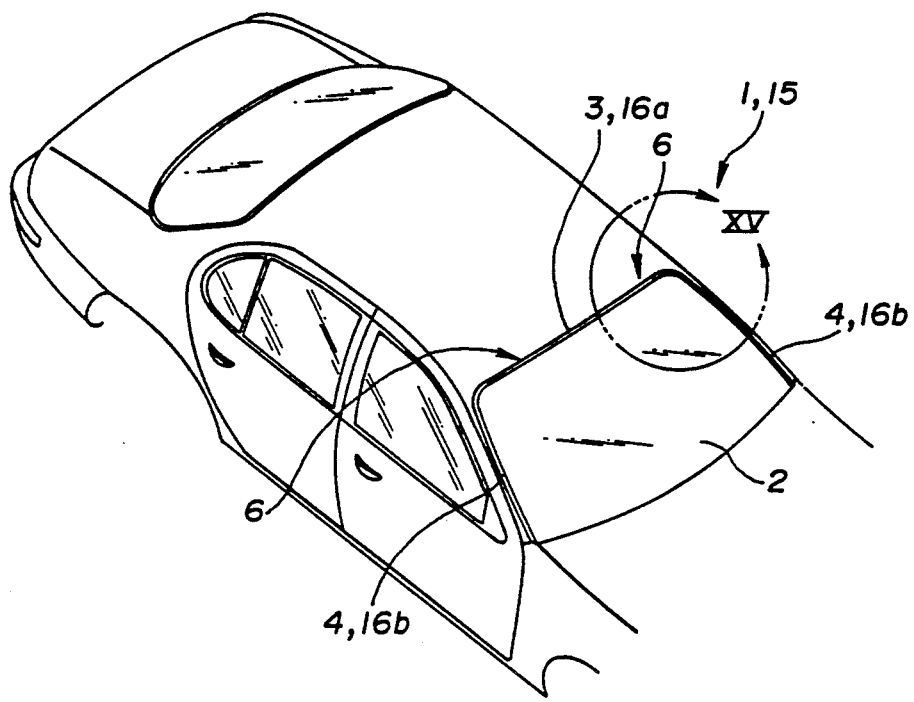
FIG. 14 is a perspective view of an automotive vehicle to which the present invention can be applied.
Figure 15:
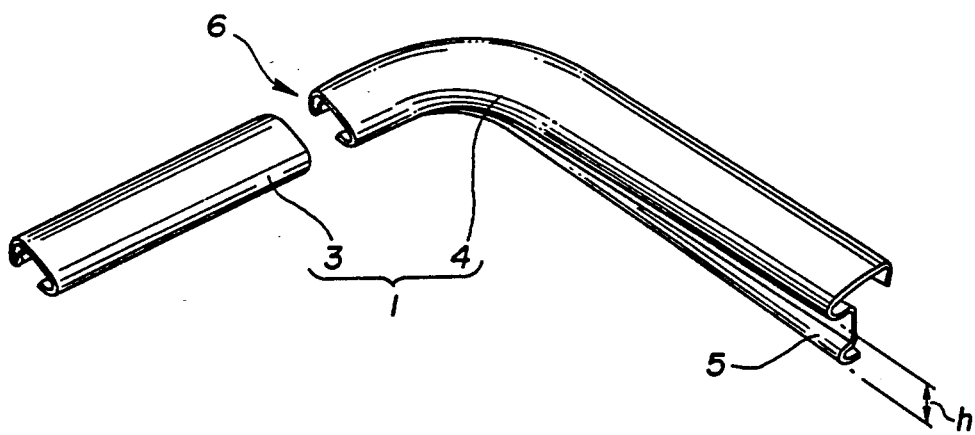
FIG. 15 is an enlarged perspective view of a prior art window molding corresponding to a portion "XV" in FIG. 14.

FIG. 13 shows a further embodiment which is substantially similar to the previous embodiment of FIG. 12 except for a leg element 60, reinforcing element 65 and a clip 66. The leg element 60 is not provided with an external covering but with a lip 62 at an inboard end portion 61 only. The leg element 60 has an outboard end portion 63 flanged outward and joined with the inner end 30a of the molding element 16. The leg element 60 is also formed with an opening 64 for use in injecting molding for forming the reinforcing element 65. By the injection molding, the molding element 16 and the leg element 60 are joined together by the reinforcing element 65 having a portion extending through the opening 64. A clip 66 is installed in the molding element 16 and held in place by the bent outer end 30b of the molding element 16. This embodiment can produce substantially the same effect to the previous embodiment of FIG. 12.

What is claimed is:

1. A window molding for an automotive vehicle comprising:
    an inverted U-like shaped single-piece molding element of a uniform C-like shaped cross section having curved inner and outer ends, said inverted U-like shaped molding element including an upper portion and opposite side portions;
    a pair of leg elements gradually increasing in height toward predetermined longitudinal ends for defining grooves extending along said side portions of said molding element, said leg elements each having a flanged outboard end of a channel-shaped cross section and having integral fingers engaged with said curved inner and outer ends of said molding element, respectively; and
    mechanical fastening means for mechanically fastening said leg elements to said side portions of said molding element, respectively, wherein said curved inner and outer ends of said molding element and said fingers of said leg elements comprise said mechanical fastening means.

2. A window molding according to claim 1, wherein said leg elements each having an inboard end for contact with a window panel of the automotive vehicle, said inboard end of each of said leg elements having a resilient U-like bent portion.

3. A window molding according to claim 2, further comprising clip means for attaching an assembly of said molding element and said leg elements to the window panel, and fastener means for attaching said clip means to a vehicle body.

4. A window molding according to claim 3, wherein said clip means comprises a clip having an outboard end attached to one of said side portions of said molding element, an inboard end for contact with an inboard side surface of the window panel and a hook, said fastener means comprising a fastener bonded to the vehicle body and having a hook for engagement with said hook of said clip.

5. A window molding according to claim 4, wherein said leg elements each have an opening for allowing said outboard end of said clip to protrude into said one side portion of said molding element.

6. A window molding according to claim 4, wherein said leg elements each have a cut-out for installation of said clip.

7. A window molding according to claim 5, wherein the vehicle body has a flanged opening portion for installation of the window panel, the flanged opening portion being recessed from an external surface of the vehicle body in such a way that a height between the external surface of the vehicle body and the flanged opening portion varies in a predetermined direction, said fastener being shaped correspondingly to said molding element and having an upper portion and a pair of side portions, said side portions of said fastener each having at an inboard end a plurality of projections of a varying height corresponding to a varying height between the external surface of the vehicle body and the flanged opening portion so that said fastener is held in place above the flanged molding portion.

8. A window molding according to claim 7, wherein said molding element is provided with an external covering which has a lip for sealing between said upper portion of said molding element and the window panel, said leg elements each being provided with an external covering which has a lip extending continuously with said lip of said covering of said molding element for sealing between said side portions of said molding element and the window panel.

9. A window molding according to claim 8, wherein said leg elements each have said external covering only at the inboard end thereof.

10. A window molding according to claim 9, wherein said clip further has an integral reinforcing portion extending between said molding element and said inboard end of said leg element.

11. A window and molding assembly for an automotive vehicle, comprising:
    a window glass;
    a vehicle body having a flanged opening portion for receiving said window glass;
    said window glass having an upper peripheral edge and opposed side peripheral edges and being bonded to said flanged opening portion; and
    a window molding having a single-piece molding element of a uniform cross section, having an inverted U-like configuration including an upper portion extending along said upper peripheral edge of said window glass and opposite side portions extending along said side peripheral edges of said window glass, a pair of leg elements independent from said molding element for defining grooves extending along said side portions of said molding element, said leg elements gradually increasing in height toward predetermined longitudinal ends, mechanical fastening means for mechanically fastening said leg elements to said side portions of said molding element, respectively and thereby forming an assembled unit, clip means for attaching said assembled unit of said molding element and said leg elements to said window glass, and fastener means for attaching said clip means to a vehicle body.

12. A window molding for an automotive vehicle comprising:
    an inverted U-like shaped single-piece molding element of a uniform C-like shaped cross section having curved inner and outer ends, said inverted U-like shaped molding element including an upper portion and opposite side portions;
    a pair of leg elements gradually increasing in height toward predetermined longitudinal ends for defining grooves extending along said side portions of said molding element, said leg elements each having a flanged outboard end of an L-like shaped cross section joined with said inner end of said molding element and an opening; and
    mechanical fastening means for mechanically fastening said leg elements to said side portions of said molding element, respectively, said mechanical fastening means comprising a reinforcing element of a synthetic resinous material extending between said molding element and the inboard end of one of said leg elements, said reinforcing element being formed by injection molding and having a portion extending through said opening of said one leg element.

* * * * *